(12) United States Patent
Maity

(10) Patent No.: US 6,895,285 B2
(45) Date of Patent: May 17, 2005

(54) COMPUTER SYSTEM STATUS MONITORING

(75) Inventor: Sanjoy Maity, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 182 days.

(21) Appl. No.: 10/154,353

(22) Filed: May 23, 2002

(65) Prior Publication Data

US 2003/0229406 A1 Dec. 11, 2003

(51) Int. Cl.[7] .................................................. G06F 11/00
(52) U.S. Cl. ........................ 700/27; 713/500; 713/502; 714/47
(58) Field of Search ............................. 700/27; 713/500, 713/501, 502; 714/23, 47, 48, 55

(56) References Cited

U.S. PATENT DOCUMENTS

| | | | | |
|---|---|---|---|---|
| 5,586,250 A | * | 12/1996 | Carbonneau et al. | 714/44 |
| 5,835,700 A | * | 11/1998 | Carbonneau et al. | 714/44 |
| 5,966,510 A | * | 10/1999 | Carbonneau et al. | 714/44 |
| 6,012,154 A | * | 1/2000 | Poisner | 714/55 |
| 6,061,810 A | * | 5/2000 | Potter | 714/23 |
| 6,438,709 B2 | * | 8/2002 | Poisner | 714/23 |
| 2003/0172320 A1 | * | 9/2003 | Mehta et al. | 714/31 |

* cited by examiner

Primary Examiner—Emanuel Todd Voeltz
(74) Attorney, Agent, or Firm—Merchant & Gould

(57) ABSTRACT

Methods, devices, and systems for monitoring the status of a computer through a driverless device node port, such as a universal serial bus port or P/S 2 port, are disclosed. A driverless device node is emulated and presents a message to the operating system of the computer through the device node port. The message requires a response from the operating system, and the time taken for the response to be generated is detected. From the detected time, the status of the computer can be found. A status indication may be transmitted from a remote management device emulating the driverless device node to a remote management computer so that the condition of the computer can be monitored remotely.

30 Claims, 4 Drawing Sheets

COMPUTER SYSTEM STATUS MONITORING

TECHNICAL FIELD

The present invention relates to monitoring of a computer system to determine its status. More particularly, the present invention relates to monitoring the computer system through interaction with a port of the computer supporting driverless device nodes.

BACKGROUND

The status of a computer system is a measure of the computer system's health at any given time as affected by the load on the computer system. As the number and complexity of the processes being handled by a computer increase, the speed of the computer in completing a given task decreases. If the computer reaches a crashed state, it can no longer complete a given task without being reset. Thus, determining the status of a computer system allows a decision to be made as to whether the computer is overloaded and cannot effectively handle additional tasks or whether the computer has crashed and must be reset.

In a distributed environment, computers known as servers perform various tasks for client computers that communicate with the server over a network. The server enables sharing of files and other resources between client computers and the server, such as electronic mail. As an example, a world wide web ("web") server may provide resources to client computers over the Internet. For successful sharing within the distributed environment, the server must maintain an acceptable status so that processes for client devices can be timely completed.

To monitor the status of a computer that is physically present, one can view the display screen and physically interact with the computer. However, to monitor a computer that is not physically present or to automate the monitoring process such as where several machines must be monitored contemporaneously, a monitoring device is coupled to the computer. Conventionally, the monitoring device communicates with the computer through the peripheral component interconnect ("PCI") bus.

One type of monitoring device captures displayed screens of the computer by capturing display data from the PCI bus. The monitoring device transfers the display data over a network to a remote maintenance computer where it can be reviewed to determine whether the computer has crashed. For example, a particular operating system may produce a specific screen display due to a crash, and this screen data is transferred to the remote maintenance computer where it can be viewed or otherwise interpreted as a crash. One can determine when a computer has crashed and must be reset by accessing the remote maintenance computer that receives the display data.

However, this transfer of the screen data to the remote maintenance computer may not provide an indication of every crash. Also, a general indication of status may not be provided by the display data absent a crashed state, so the load on the computer may not be known. Additionally, a device that operates on the PCI bus to capture data requires a device driver that is compatible with the operating system of the computer being monitored. The operating system must dedicate system resources and processing time to the device driver, and the performance of the computer being monitored is adversely affected as a result.

SUMMARY

Embodiments of the present invention provide status monitoring of a computer by emulating a driverless device node for a port of the computer that supports driverless devices. The driverless device node asserts a message that requires a status response to the operating system of the computer. The amount of time required for a status response to be returned from the operating system is detected. A status indication is then generated based on the amount of time detected for the response.

An embodiment of a device that monitors the status includes a processing device that provides the driverless device node emulation to assert the message requiring the status response. The processing device detects the amount of time required for the response and generates the status indication. A communications device transmits the status indication to a remote location where monitoring of the status indication is performed.

An embodiment of a system that monitors the status of a computer includes an operating system that is executed by the computer and that recognizes a port of the computer that supports driverless device nodes. A remote management device includes a processing device emulating the driverless device node for the port of the computer. The remote management device also includes a communications device coupled to a network that transmits the status indication over the network to a remote maintenance computer.

The various aspects of the present invention may be more clearly understood and appreciated from a review of the following detailed description of the disclosed embodiments and by reference to the drawings and claims.

DETAILED DESCRIPTION

Figure 1:
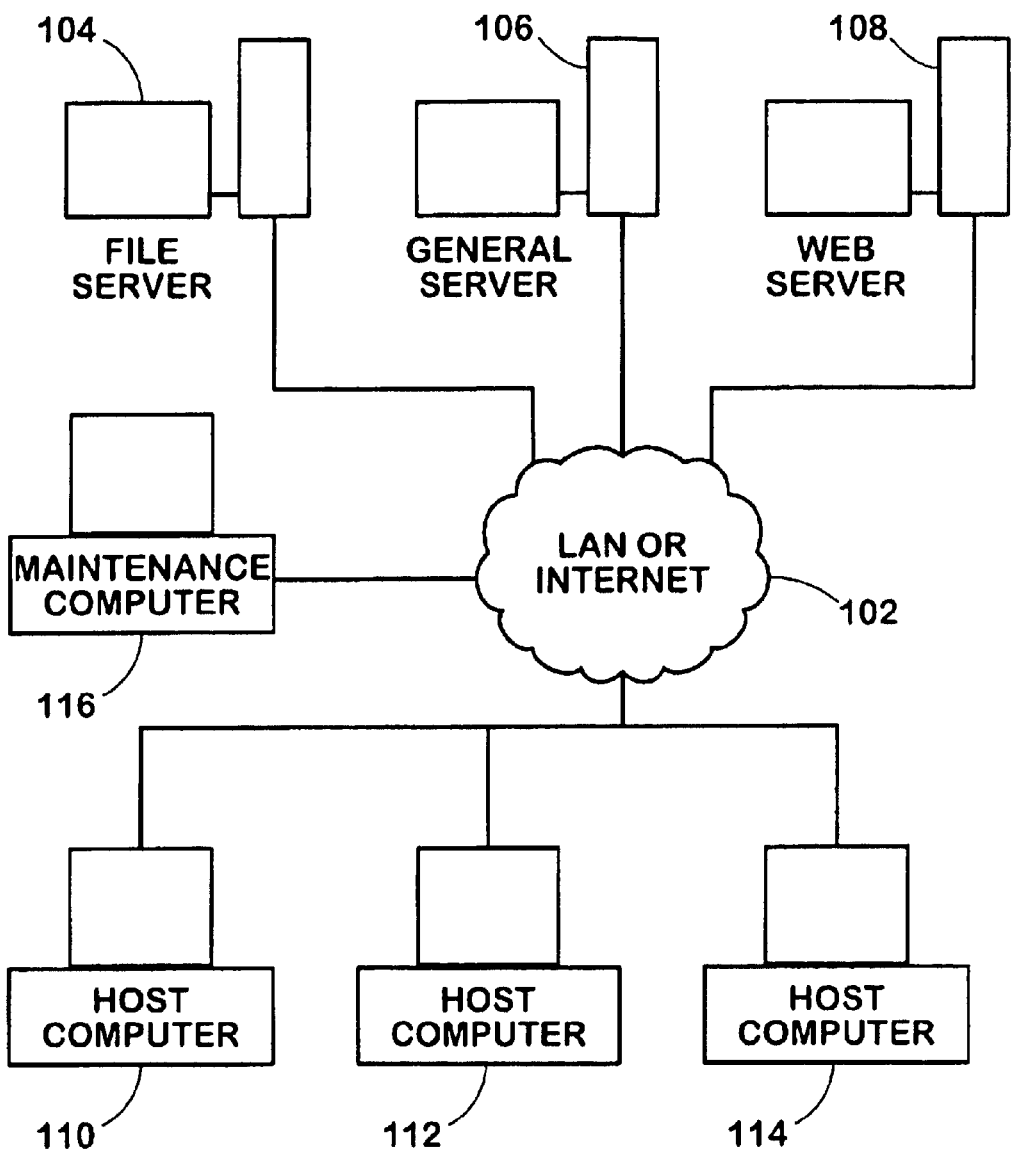
FIG. 1 shows an exemplary network operating environment of one embodiment of the present invention.

The status of a computer is monitored to maintain the operation of the computer. For example, the computer being monitored may be a stand-alone machine or a server in a network environment. An example of an environment for employing a computer status monitor is shown in FIG. 1. One or more computers may be linked through a network 102 such as a local area network ("LAN") or the Internet. The computers may include servers such as a file server 104, general server 106, and web server 108 as well as clients such as host computers 110, 112, and 114.

A status monitor is coupled to one or more of the computers. The status monitor provides a status indication to illustrate the condition of each computer being monitored. The status indication may take various forms such as a visual or audible alert for personnel in close proximity to the individual computers. Alternatively or in addition to the visual or audible alert, a status indication may be transmitted to a remote maintenance computer 116 connected to the network 102. The connection of the remote maintenance computer 116 to the status monitors of each computer may be an extension of the network 102 interconnecting the computers being monitored or may be a separate network such as a gateway to the Internet independent of the network 102.

Figure 2:
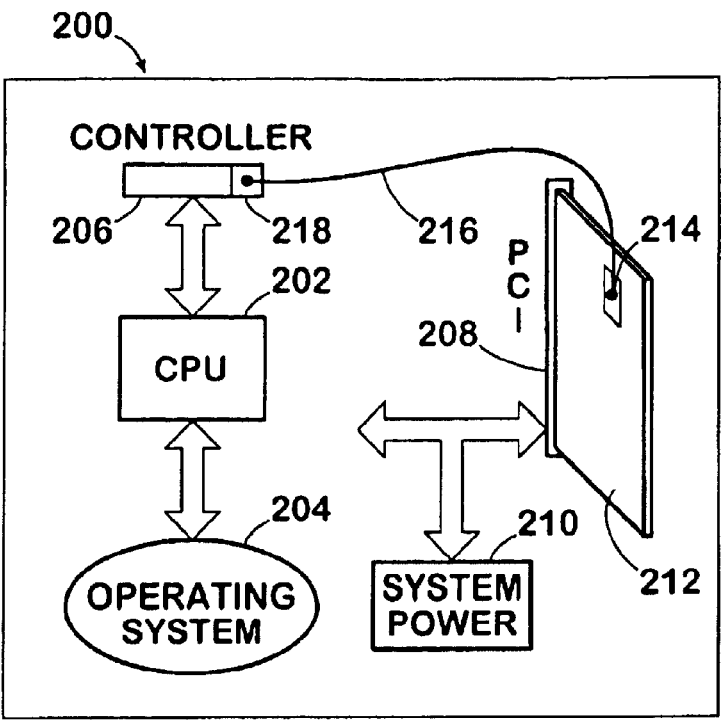
FIG. 2 shows one embodiment of the present invention coupled to a motherboard of the computer being monitored and connected to a port of the computer supporting one or more driverless device nodes.

FIG. 2 shows a standard computer motherboard 200 of one of the computers being monitored and an embodiment of a status monitor that is coupled to the motherboard 200. The motherboard 200 includes the central processing unit (CPU) 202 that executes an operating system 204. The operating system is generally provided from a storage device such as a hard disk drive (not shown). The motherboard includes a controller 206 that supports driverless device nodes and that communicates with the CPU 202. The operating system 204 recognizes the presence of the controller 206 and any of the driverless device nodes in communication with the controller 206. A driverless device node is one that is recognized by the operating system without specific device drivers for the device being utilized by the operating system.

The controller 206 may be of various forms including a universal serial bus (USB) controller, USB 2 controller, P/S 2 controller, firewire (IEEE 1394) controller, or other controller that supports driverless device nodes. Device nodes include the digital logic for the devices that communicates with the controller 206, such as digital logic incorporated into a keyboard, joystick, or other peripheral device.

The motherboard 200 includes a PCI expansion slot 208 that is in communication with the CPU 202. The motherboard 200 receives power from a power supply through a system power connection 210, and system power is distributed to the various components including the PCI expansion slot 208. An embodiment of a status monitor is included on a card 212 that is disposed within the PCI slot 208. The status monitor of card 212 may draw power from the PCI slot 208 in addition to utilizing an on-board battery back up and/or an A/C wall adapter.

The status monitor of card 212 includes a driverless device node connection 214. The driverless device node connection 214 connects to a port 218 of the controller 206 via a cable 216. Signals are passed between the driverless device node connection 214 and the controller 206 through the cable 216 to enable the monitoring card 212 to communicate bi-directionally with the CPU 202 and operating system 204. The status monitor of card 212 does not require communications through the PCI slot 208 so no device driver for the particular operating system 204 is required, and PCI bus bandwidth is not used for monitoring purposes. In addition to or as an alternative to drawing power through the PCI slot 208, the card 212 may draw power from the port 218.

The status monitoring operations of card 212 function independently of the system that it is monitoring, so the monitoring of the computer is not affected by its status. Furthermore, the card 212 may optionally be equipped with additional functionality to initiate resetting and power down of the computer via an interface to the reset and power connections (not shown) of the computer. For example, the status monitor of card 212 may detect a crashed state of the computer which necessitates a reset. The additional functionality of card 212 then initiates a reboot of the computer being monitored by activating a reset. The card 212 also may be optionally configured to provide control of the computer being monitored from a remote location.

Figure 3:
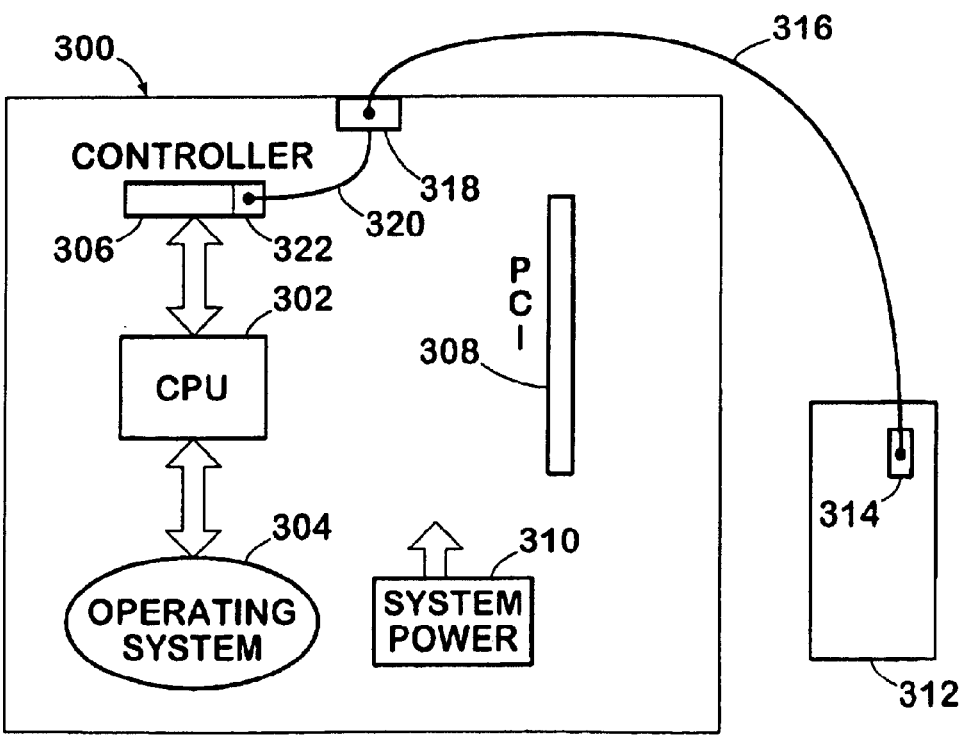
FIG. 3 shows one embodiment of the present invention external to the computer being monitored and connected to a port of the computer supporting one or more driverless device nodes.

FIG. 3 shows a standard motherboard 300 and an alternative embodiment of the status monitor that is included on an external card 312. The computer being monitored includes the motherboard 300 that employs a CPU 302 executing the operating system 304. The CPU 302 communicates with the controller 306. System power 310 is provided to the various components including the PCI slot 308, CPU 302, and controller 306. The controller 306 has an internal port 322 that is electrically connected to an external port 318 by a cable 310.

The status monitor of the card 312 includes a device node connector 314 that is electrically linked to the external connector 318 of the computer by a cable 316. As described for the embodiment of FIG. 2, the status monitor of card 312 communicates bi-directionally with the CPU 302 through the connection to the controller 306. The status monitor functions independently of the computer being monitored in this embodiment as well so the status of the computer does not affect the monitoring operations. In this embodiment, the card 312 may draw power from the port 322 as an alternative to or in addition to other power sources such as an on-board battery back-up or A/C wall adapter.

Figure 4:
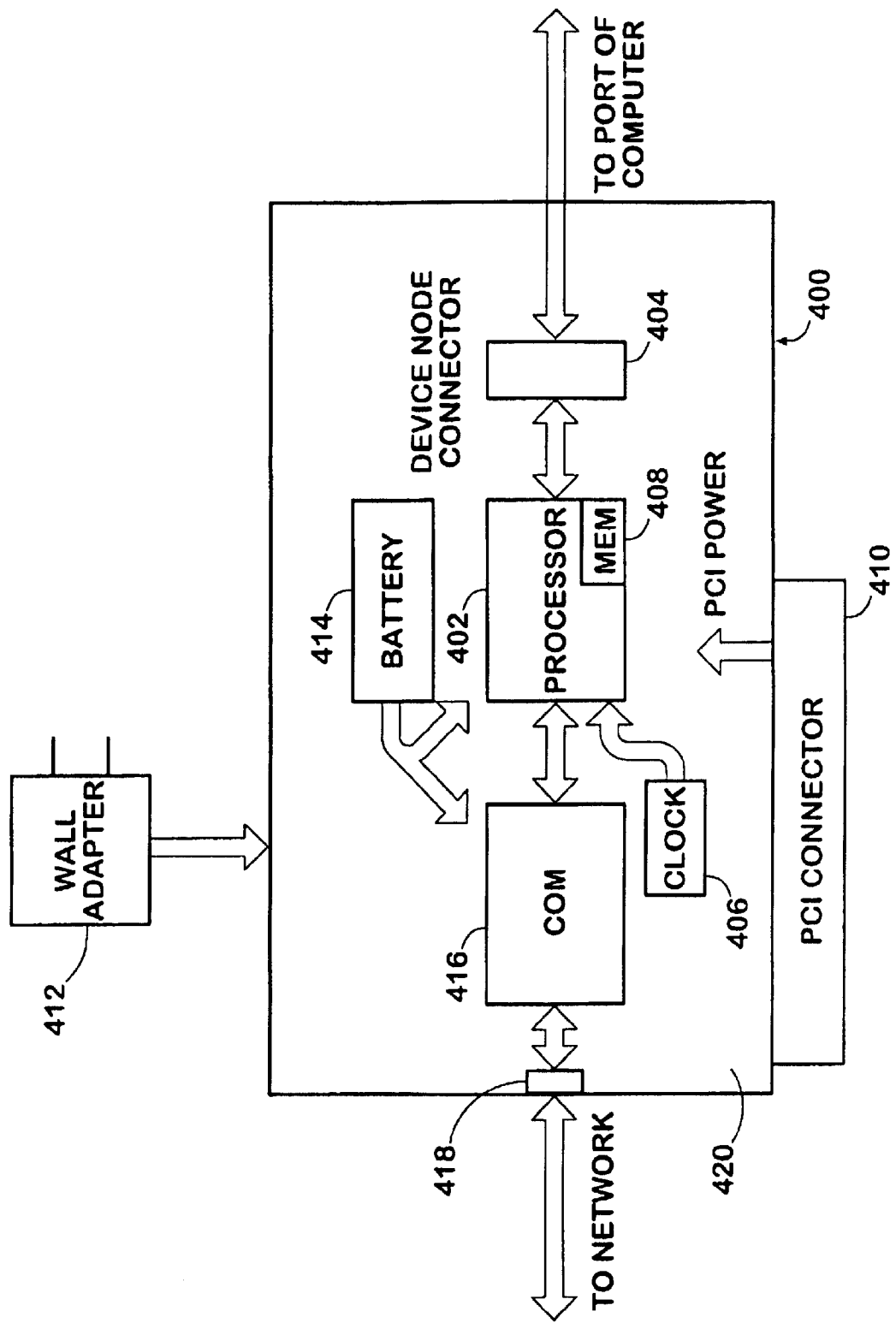
FIG. 4 shows exemplary components of one embodiment of the present invention.

FIG. 4 illustrates the major components of an embodiment of a status monitor 400. The status monitor 400 is mounted on a card 420. The card 420 may be adapted for external installation as shown in FIG. 3 or for internal installation as shown in FIG. 2. For internal installation, the card has a card edge connector 410 such as a PCI connector for installation within a PCI slot. Other configurations are possible as well such as installation as a daughterboard within a dedicated slot for the daughterboard on the motherboard of the computer. As discussed above, power for the components of the status monitor may be drawn from the power supplied through the PCI bus to the PCI connector 410.

The status monitor 400 may maintain its own independent power sources. An on-board battery 414 may be provided to supply power when other sources are unavailable, such as when the system power to the computer being monitored is terminated. Additionally, a wall adapter 412 may be utilized to provide DC system power from an AC source such as the standard 110V AC.

The status monitor 400 includes a processing device 402 that is programmed to emulate a driverless device node for the driverless device node controller of the computer being monitored. The processing device 402, such as the ISP1181 model from Philips Electronics, may be programmed to emulate one or more various devices. For example, the processing device may emulate a human interface device such as a USB keyboard or joystick to the controller and operating system of the computer being monitored. Assuming the computer being monitored already has a peripheral device connected such as a standard keyboard, then the operating system recognizes both the standard keyboard and the USB keyboard being emulated by the status monitor 400.

The device node is emulated from a driverless device node connector 404 that communicates with the processing device 402. The device node connector 404 is electrically connected to the controller of the computer through a cable or other electrical connection. System power from the port of the computer may be provided to the status monitor 400 through the connector 404.

The processing device 402 is configured to assert messages from the emulated device node through the connector 404 to the operating system of the computer. The asserted messages are chosen so that they require a reply from the operating system. For example, a scroll lock, number lock, or caps lock message including a key down signal followed by a key up signal requires that the operating system send a reply to turn on the light associated with the key being depressed. When asserting a keystroke message, the processing device 402 may be configured so that the device node immediately repeats the keystroke to reverse the instruction to the operating system and eliminate any effect on the computer being monitored. The processing device 402 is further configured to read for the required replies from the operating system during a reply interrupt routine of the device node.

To determine the status of the computer being monitored, the processing device 402 detects the amount of time that elapses from the time the message is sent from the device node until the reply from the operating system is received. A clock 406 located on a card of the status monitor 400 or located externally or remotely from the status monitor 400 provides a timing reference used by the processing device 402 to determine the amount of time that elapses. The processing device 402 can determine the status of the computer by looking up the detected time in a table stored in memory 408. Memory 408 may be integrated with the processing device 402 or may be separate and communicate over a bus with the processing device 402. Memory 408 may include combinations of both random access and read only memories.

The table data being referenced may be generated through tests on the computer being monitored or a computer of similar configuration. A load may be simulated and the required time for response to the message asserted by the device node is recorded for the known load. This is repeated for various loads to populate the table with status data. A maximum elapsed time may also be defined in the table to indicate that the computer has crashed if the reply is not received before the maximum time is reached.

Once the status of the computer has been found in relation to the elapsed time, the processor 402 generates a status indication. The status indication may be a visual or audible signal to someone in close proximity. Alternatively or in addition to the close proximity signal, the status indication may be a message sent to a remote location such as the remote maintenance computer 116 of FIG. 1. In an embodiment where a signal to a remote location occurs, the processor 402 communicates with a communication device 416 to transmit the signal to the remote location.

The communication device 416 may be an Ethernet device such as model 82559 by Intel Corporation, standard analog, DSL, or cable modem, ISDN interface, or other similar data communications unit. The communications device 416 communicates through a port 418 to the appropriate interface such as an Ethernet port, telephone line, cable line, or ISDN line.

Figure 5:
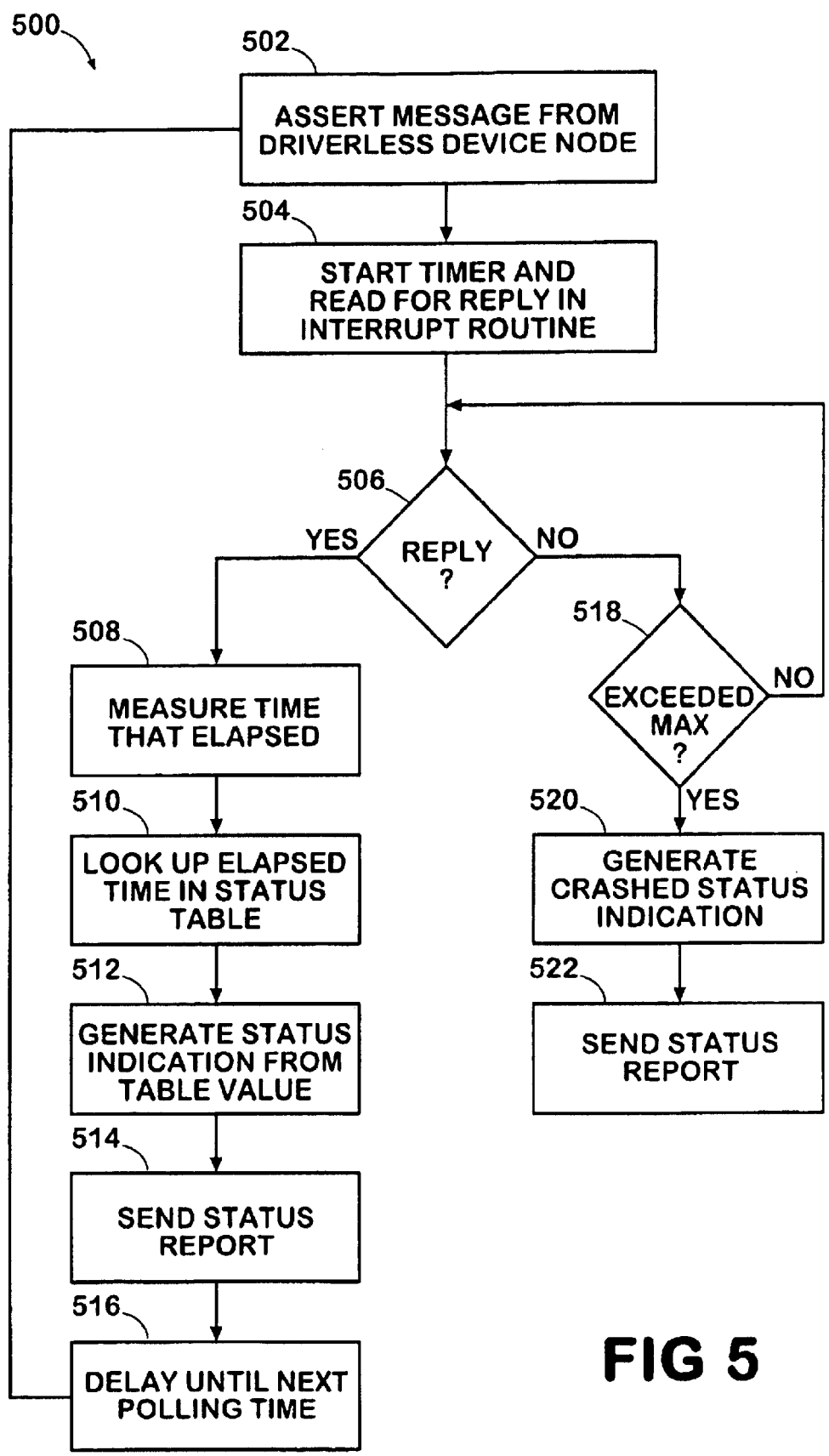
FIG. 5 shows exemplary logical operations of one embodiment of the present invention.

The logical operations of the status monitor 400 are shown in FIG. 5. The status monitor 400 may delay monitoring until the computer being monitored has completed booting up such as by delaying a set period of time once a power signal is received through the device port or PCI slot of the computer. Once status monitoring is started, the logical operations of status monitoring begin at assertion operation 502.

At assertion operation 502, the processing device 402 asserts a message from the driverless device node to the controller and ultimately the operating system of the computer being monitored. As discussed above, the message that is asserted is one that requires a status reply from the operating system, such as a scroll lock keystroke down followed by a scroll lock keystroke up. At that point, the processing device 402 begins timing by storing a time stamp in memory 408 and begins reading for the reply through connector 404 at timer operation 504.

When a reply interrupt period for the device node is reached and an attempt to read a reply has occurred, the processing device 402 determines whether a reply has been read at query operation 506. For example, where a scroll lock keystroke down followed by a scroll lock keystroke up sequence is delivered as the message asserted to the operating system, the processing device 402 reads for two replies, the first of which indicates that the light on the keyboard should go on.

If a reply was received, then the processor 402 measures the time that elapsed until the reply occurred at time operation 508. The elapsed time is measured with reference to the time the message was sent and the time when the reply was received. Once the elapsed time is known, the processor 402 performs a look-up of the time in the status table to find the associated status at table operation 510. The processor 402 then generates a status indication by obtaining the status value from the table at status operation 512. The processor 402 may trigger a visual or audible alert if the status indicates that the computer is overloaded.

Alternatively, the processor 402 may pass the status indication to the communications device for delivery to a remote location. Once the communications device receives the status indication and instruction to send from the processor 402, the communications device transmits the status indication at send operation 514. The processor 402 may be configured with thresholds that it employs to determine whether a status indication should be delivered or ignored. For example, if a computer is not overloaded then the processor 402 may provide no status indication alert because the computer requires no further attention.

Once the status indication has been transmitted or alternatively ignored, the processor 402 waits until the next appropriate polling time at delay operation 516. The delay may be measured with reference to the timing signal from the clock 406. The polling period may be set at whatever period the user desires. For example, the polling period may be very short so that the driverless device node again asserts the message only a few computer system cycles after receiving the last reply. Once the delay ends, operational flow transitions back to assertion operation 502 for the monitoring process to repeat.

On iterations where the query operation 506 detects that no reply has been received from the operating system at the device node, operational flow transitions to query operation 518. Here, the processing device 402 detects whether the previously defined maximum elapsed time has been exceeded. If not, then at the next reply interrupt the processor 402 again reads for a reply and query operation 506 detects whether the reply occurred. If the maximum elapsed time has been exceeded prior to receiving the reply, then the processor 402 generates a crashed status indication at status operation 520. The processor 402 may then create the visual or audible alert and/or transmits the status to the remote location through the communication device 416 at send operation 522. Alternatively, additional functionality of the card, if any, may automatically initiate a reset of the computer.

As described above, the card providing the status monitor or an additional remote management card may include additional functionality that permits the computer to be reset or powered down. The remote management computer may control the computer being monitored so as to reboot the computer and implement a diagnostic program prior to resuming normal computer activity. These additional functions may result from or occur independently of the status indication provided by embodiments of the present invention.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of detecting a status of a computer executing an operating system, comprising:
    emulating a driverless device node recognized by the operating system;
    asserting a message from the emulated driverless device node that requires a status response from the operating system;
    detecting an amount of time taken for the operating system to provide a status response to the emulated driverless device node; and
    generating a status indication for the computer based upon the detected amount of time.

2. The method of claim 1, further comprising delaying asserting the message until the computer has finished booting.

3. The method of claim 1, wherein generating a status indication comprises comparing the detected amount of time to response times in a table that indexes response time with a status of the computer.

4. The method of claim 3, further comprising:
    simulating a plurality of loads on the computer to determine the amounts of time that correspond to the loads; and
    storing the determined amounts of time in the table so that the amounts of time are indexed with a status corresponding to the plurality of loads.

5. The method of claim 1, further comprising sending the status indication over a remote connection to report the status to a remote computer.

6. The method of claim 1, wherein emulating a driverless device node comprises emulating a USB device.

7. The method of claim 6, wherein the USB device is a keyboard and wherein asserting a message from the emulated USB device node comprises asserting a scroll lock from the emulated USB keyboard.

8. The method of claim 7, wherein asserting a scroll lock comprises asserting a scroll lock on signal followed by a scroll lock off signal.

9. The method of claim 1, further comprising powering the emulated driverless device node through a port of the computer.

10. The method of claim 1, wherein asserting the message from the emulated driverless device node is repeated over defined intervals.

11. The method of claim 1, wherein asserting a message comprises sending a virtual keystroke signal that requires a predetermined response from the operating system; and
    the predetermined response comprises the status response.

12. The method of claim 1, wherein asserting a message comprises:
    sending a virtual keystroke signal that comprises an instruction to the operating system and requires a predetermined response from the operating system, and immediately repeating the virtual keystroke signal to reverse the instruction to the operating system, thereby eliminating any effect on the computer.

13. A device that detects the status of a computer executing an operating system, comprising:
    a processing device that emulates a driverless device node recognized by the operating system, asserts a message from the emulated driverless device node to the operating system that requires a status response, detects an amount of time taken for the operating system to provide the status response, and generates a status indication based on the detected amount of time; and
    an external communication device in communication with the processor to transmit the status indication to a remote location.

14. The device of claim 13, further comprising a power supply powering the processor and external communication device.

15. The device of claim 14, wherein the power supply comprises a battery and an AC adapter, wherein the battery begins powering when the AC adapter stops powering.

16. The device of claim 14, wherein the power supply comprises a coupling to a port of the computer.

17. The device of claim 13, further comprising:
    a power supply powering the processor and external communication device; and
    a peripheral component interconnect (PCI) card within a PCI slot of the computer, wherein the processing device, external communication device, and power supply are mounted to the PCI card and wherein the power supply comprises a coupling to the power output of the PCI slot.

18. The device of claim 13, further comprising a daughterboard to a motherboard of the computer, wherein the processing device and external communication device are mounted to the daughterboard.

19. The device of claim 13, wherein the emulated driverless device node comprises an emulated USB device.

20. The device of claim 13, wherein the emulated USB device is a keyboard and wherein the message from the emulated USB device node comprises a scroll lock from the emulated USB keyboard.

21. The device of claim 13, wherein the external communications device comprises an Ethernet device.

22. The device of claim 13, wherein the processing device is operative to assert a message comprising a virtual keystroke signal that requires a predetermined response from the operating system, the predetermined response comprising the status response.

23. The device of claim 13, wherein the processing device is operative to assert a message comprising a virtual keystroke signal that comprises an instruction to the operating system and requires a predetermined response from the operating system, and to immediately repeat the virtual keystroke signal to reverse the instruction to the operating system,
    thereby eliminating any effect on the computer.

24. A system for providing status of a host computer to a remote maintenance computer, comprising:
    a host computer that includes a driverless device node port and that executes an operating system;
    a remote maintenance computer coupled to a network; and
    a remote management device that comprises:
        a processing device electrically coupled to the port that emulates a driverless device node recognized by the operating system, asserts a message to the operating system from the emulated driverless device node that requires a status response, detects an amount of time taken for a response, and generates a status indication based on the detected amount of time; and an external communications device that is coupled to the network and in communication with the processing device and that sends the status indication over the network to the remote maintenance computer.

25. The system of claim 24, wherein the network comprises the Internet.

26. The system of claim 24, wherein the network is a local area network.

27. The system of claim 24, wherein the external communications device comprises an Ethernet device.

28. The system of claim 24, wherein the emulated driverless device node comprises a USB keyboard and wherein the message from the emulated USB device node comprises a scroll lock from the emulated USB keyboard.

29. The system of claim 24, wherein the processing device is operative to assert a message comprising a virtual keystroke signal that requires a predetermined response from the operating system, the predetermined response comprising the status response.

30. The system of claim 24, wherein the processing device is operative to assert a message comprising a virtual keystroke signal that comprises an instruction to the operating system and requires a predetermined response from the operating system, and to immediately repeat the virtual keystroke signal to reverse the instruction to the operating system, thereby eliminating any effect on the computer.

* * * * *